July 2, 1968   L. J. RUFFNER   3,391,312
MODULE CAPACITOR
Filed July 6, 1966

INVENTOR.
Lawrence J. Ruffner
BY Ralph Hammar
Attorney

United States Patent Office 3,391,312
Patented July 2, 1968

3,391,312
MODULE CAPACITOR
Lawrence J. Ruffner, State College, Pa., assignor to Erie Technological Products, Inc., Erie, Pa., a corporation of Pennsylvania
Filed July 6, 1966, Ser. No. 563,184
2 Claims. (Cl. 317—258)

ABSTRACT OF THE DISCLOSURE

A capacitor module having two titanate green ceramic films, one film being electroded on one face with a platinum or similar high temperature paint which extends to but not beyond the edge of the film at a minor portion of its periphery, and the other film being plain and overlying the first film. Both films have a thickness substantially in the range of 3 to 6 mils, or too thin to be fired separately. However, when fired as a unit, the films reinforce each other and the electrode is sealed between the films except at the minor portion of the peripheral edge which is accessible for making connections. A finished capacitor is made by electroding the outer surface with a low temperature metal such as silver.

This invention is a capacitor module made from two thin green ceramic dielectric films and having an internal electrode of precious metal matured or fired with the green ceramic films and an external electrode in capacity relation to the internal electrode through both of the films. The external electrode is applied after firing and accordingly need not be of precious metal able to withstand the ceramic firing temperatures. The two films reinforce each other, providing a more rugged structure.

Figure 1:
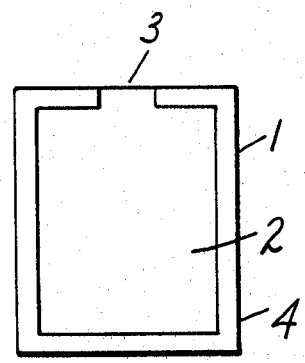
Figure 2:
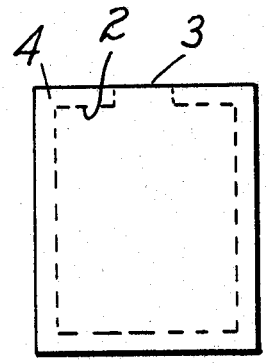
Figure 3:
Figure 4:
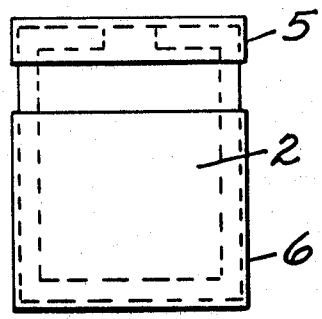
Figure 5:
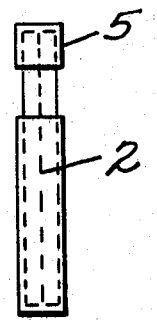

In the drawing, FIG. 1 is a plan view of a green ceramic dielectric film electroded on one face with a precious metal paint, FIG. 2 is a plan view of the FIG. 1 film arranged face to face with an unelectroded green ceramic film, FIG. 3 is an edge view of FIG. 2, FIG. 4 is a plan view of a capacitor made from the module, and FIG. 5 is an edge view of FIG. 4.

In a preferred form, the capacitor module consists two green ceramic dielectric films, a film 1 having on one face a precious metal paint electrode 2 and a plain film identical with the film 1 except that it has no electrode. The green films will ordinarily be from 3 to 6 mils thick and of any desired ceramic such as one of the titanate mixtures. The films may be of the same or of different dielectric properties. For example, the thickness, temperature coefficient, or dielectric constant may differ. One advantage of films of different dielectric properties is that the properties of one film may supplement or compensate properties of the other film. For example the combined dielectric constant of the films could be flatter or exhibit less change with temperature than either film alone. The paint 2 will ordinarily be made from one or more of the high temperature precious metals such as palladium, platinum, or similar metal capable of withstanding the ceramic firing temperatures. The paint is referred to in the claims as "high temperature precious metal paint." The electrode 2 extends out to but not beyond the peripheral edge of the film 1 at one section 3 which comprises a minor portion of the periphery of the film. This is for the purpose of providing an exposed edge to which electrical contact may be made to the electrode. The remainder of the electrode 2 is spaced inward from the peripheral edges of the film to provide a margin 4 of ceramic encircling the major portion of the electrode.

The film 1 and a plain unelectroded film are stacked with the margins 4 of each film in face to face contact with each other and with the metal paint electrode 2 of film 1 in contact with the plain film. During firing, the margins of the films coalesce and the electrode 2 matures, providing a unitary structure having dielectric properties throughout the thickness of the films and a single internal electrode sealed by the margin except at the section 3 where the electrode 2 extends to but not beyond the peripheral edge. At the section 3, the internal electrode is exposed for making electrical connections.

The fired structure will ordinarily have a total thickness in the range of five to ten mils or twice the thickness of the individual film 1. The margins 4 are well sealed throughout because of the tendency of the green ceramic to coalesce or fuse together during firing. While the electrode 2 is of expensive precious metal, the cost is reduced by the fact that only a single precious metal electrode is required. These factors combine to produce a module of high reliability and relatively low cost. The double thickness reduces the possibility of breakage.

To make a finished capacitor, relatively inexpensive outer electrodes may be used such as low temperature silver paint. For example, one end of the module may be dipped in silver paint to provide a coating 5 in contact with the section 3 of the internal electrode 2. The other end of the module may be dipped in silver paint to provide an external metal electrode coating 6 on the fired ceramic encircling and in overlapping relation to the internal electrode 2. When applied by dipping, the coating 6 is connected over the edges of the module. Two separate coatings could be separately applied (or the over edge connection could be removed) if the over edge connection were not desired. The painted unit may then be fired at low temperature to mature the coatings 5 and 6. The completed unit is a double set of capacitors from the internal electrode 2 to the outer electrode 6, respectively through one and the other of the ceramic films. When the electrodes 6 on opposite faces of the module are connected together as shown, the capacitors are connected in parallel. When the over edge connection of electrodes 6 is omitted, separate capacitors are provided. The characteristics of the capacitors depend upon the dielectric properties of the respective ceramic films. Three electrodes are used to produce the double capacitance but only one of these electrodes is of the expensive, high temperature, precious metal.

Before the application of the outer electrodes 6, the module has zero capacitance. When the outer electrodes 6 are applied to fully overlap the internal electrode 2, double capacitance is obtained. When the outer electrodes are applied to a lesser degree of overlap, a lesser capacitance is obtained. This permits variation in the total capacity of the module from zero to 200%.

After applying the external electrode coatings 5, 6, the module may be provided with leads and encapsulation in the usual manner.

What is claimed as new is:
1. A capacitor module consisting of a laminate of first and second titanate ceramic films each of thickness substantially in the range of 3 to 6 mils and having dielectric properties throughout the thickness of the film, said first film having on one face an electrode of high temperature precious metal paint, said electrode extending to but not beyond the peripheral edge of the film at one section comprising a minor portion of the periphery and being spaced inward from the remainder of the peripheral edges of the film to provide a margin of ceramic encircling the major portion of the electrode, said second film having a margin of the first film and a central portion overlying the electrode and central portion respectively in face to face contact with the margin and precious metal paint electrode of the first film, said films being coalesced together into a unitary ceramic structure having an internal precious metal paint electrode within the ceramic structure and sealed by the margins except for said section where the electrode connected together extends to the peripheral edge, low temperature external metal electrode on the ceramic structure overlapping the internal electrodes to provide a double set of capacitors from the internal electrode to the external electrodes respectively through the first and second films.

2. The capacitor module of claim 1 in which the external electrodes are connected to each other over an edge of the module to connect the capacitors in parallel.

References Cited
UNITED STATES PATENTS

| | | | |
|---|---|---|---|
| 2,531,389 | 11/1950 | Brandt | 317—261 X |
| 2,694,185 | 11/1954 | Kodama. | |
| 2,972,570 | 2/1961 | Haas | 317—258 X |
| 3,238,429 | 3/1966 | Bornhorst | 317—261 |
| 3,243,315 | 3/1966 | Markarian | 317—258 |
| 3,274,468 | 9/1966 | Rodriguez | 317—258 |
| 3,235,939 | 2/1966 | Rodriguez. | |
| 3,321,683 | 4/1967 | Tatem | 317—258 |

DARRELL L. CLAY, *Primary Examiner.*

LEWIS H. MYERS, *Examiner.*

E. GOLDBERG, *Assistant Examiner.*